United States Patent
Bridges

(10) Patent No.: US 10,900,669 B2
(45) Date of Patent: Jan. 26, 2021

(54) WATER SYSTEMS

(71) Applicant: EQUITHERM LIMITED, Bristol (GB)

(72) Inventor: Maxwell Stephen Bridges, Bristol (GB)

(73) Assignee: EQUITHERM LIMITED, Bristol (GB)

( * ) Notice: Subject to any disclaimer, the term of this patent is extended or adjusted under 35 U.S.C. 154(b) by 0 days.

(21) Appl. No.: 16/074,591

(22) PCT Filed: Feb. 2, 2017

(86) PCT No.: PCT/EP2017/052231
§ 371 (c)(1),
(2) Date: Aug. 1, 2018

(87) PCT Pub. No.: WO2017/134151
PCT Pub. Date: Aug. 10, 2017

(65) Prior Publication Data
US 2019/0041067 A1    Feb. 7, 2019

(30) Foreign Application Priority Data
Feb. 2, 2016   (GB) .................................. 1601848.3

(51) Int. Cl.
*F24D 17/00*    (2006.01)
*F24D 19/10*    (2006.01)
(Continued)

(52) U.S. Cl.
CPC .......... *F24D 17/0084* (2013.01); *E03B 7/045* (2013.01); *E03B 7/12* (2013.01);
(Continued)

(58) Field of Classification Search
CPC ..... Y10T 137/87161; Y10T 137/85954; F16K 11/0856; F16K 11/0873; F24D 17/0084;
(Continued)

(56) References Cited

U.S. PATENT DOCUMENTS 3,103,946 A * 9/1963 Troxell .................... E03B 7/14
137/337
4,946,079 A * 8/1990 Campbell .............. B67D 3/048
222/484

(Continued)

FOREIGN PATENT DOCUMENTS

DE    3105406 A1    9/1982
DE    3403859 A1    8/1985
(Continued)

OTHER PUBLICATIONS

Search Report issued in GB Patent Application No. 1306696.4 dated Oct. 10, 2013.
(Continued)

Primary Examiner — Atif H Chaudry
(74) Attorney, Agent, or Firm — Nixon & Vanderhye

(57) ABSTRACT

A circulating hot water system has a hot water flow circuit defined by pipework leading out from and back to an in-line heater, and including a pump to drive circulation of the hot water. Each of multiple user points has an outflow branch conduit and a return flow branch conduit with a common wall for heat exchange, as does the main flow circuit: the outflow conduit surrounds the return conduit. Water is fed into the system from a pressurized cold water supply main through a check valve. Sensors are used to monitor water temperatures and flow conditions around the system. A programmed control processor can control heating and pumping rates in various regimes, e.g. to maintain system (Continued)

temperature above a predetermined threshold. An isolation valve adapted for concentric double pipes is also described.

12 Claims, 12 Drawing Sheets

(51) Int. Cl.
*E03B 7/12* (2006.01)
*E03B 7/04* (2006.01)
*F16K 11/085* (2006.01)
*F16L 9/19* (2006.01)
*F16L 9/18* (2006.01)
*F16K 11/087* (2006.01)

(52) U.S. Cl.
CPC ...... *F16K 11/0856* (2013.01); *F16K 11/0876* (2013.01); *F16L 9/18* (2013.01); *F16L 9/19* (2013.01); *F24D 19/1051* (2013.01); *F24D 2220/0207* (2013.01); *F24D 2220/0264* (2013.01); *Y10T 137/85954* (2015.04); *Y10T 137/87161* (2015.04)

(58) Field of Classification Search
CPC ........ F24D 19/1051; E03B 7/045; E03B 7/12; F16L 9/18; F16L 39/005; F16L 9/19
See application file for complete search history.

(56) References Cited

U.S. PATENT DOCUMENTS

| | | | |
|---|---|---|---|
| 5,435,521 A | 7/1995 | Jarecki | |
| 5,791,370 A * | 8/1998 | Harland | F16L 9/18 137/334 |
| 5,988,218 A | 11/1999 | Hecking | |
| 2010/0126604 A1 * | 5/2010 | Lund | F24D 17/0078 137/565.01 |
| 2013/0126769 A1 * | 5/2013 | Weir | F16K 11/074 251/315.01 |
| 2014/0229022 A1 * | 8/2014 | Deivasigamani | G05D 23/1904 700/282 |
| 2014/0311587 A1 | 10/2014 | Ellis | |

FOREIGN PATENT DOCUMENTS

| | | |
|---|---|---|
| DE | 3508874 A1 | 9/1986 |
| DE | 3542374 A1 | 5/1987 |
| DE | 8533721 U1 | 4/1988 |
| DE | 19755464 C1 | 8/1999 |
| DE | 29911745 U1 | 11/2000 |
| DE | 19934787 A1 | 2/2001 |
| DE | 10055117 A1 | 5/2002 |
| EP | 0884539 A1 | 12/1998 |
| EP | 1081438 A2 | 3/2001 |
| EP | 2365141 A2 | 9/2011 |
| GB | 2 448 384 A | 10/2008 |
| JP | S58-78025 A | 5/1983 |
| WO | 98/35178 A1 | 8/1998 |
| WO | 2004/070279 A2 | 8/2004 |
| WO | 2007/090238 A1 | 8/2007 |
| WO | 2012/006344 A2 | 1/2012 |
| WO | 2013/150536 A2 | 10/2013 |
| WO | WO-2016144250 A1 * | 9/2016 ............... E03B 7/04 |

OTHER PUBLICATIONS

Search Report issued in GB Patent Application No. GB1701704.7 dated Jun. 26, 2017.
Search Report issued in GB Patent Application No. GB1916227.0 dated Nov. 21, 2019.
International Search Report issued in International Application No. PCT/EP2017/052231 dated Jul. 12, 2017.

* cited by examiner

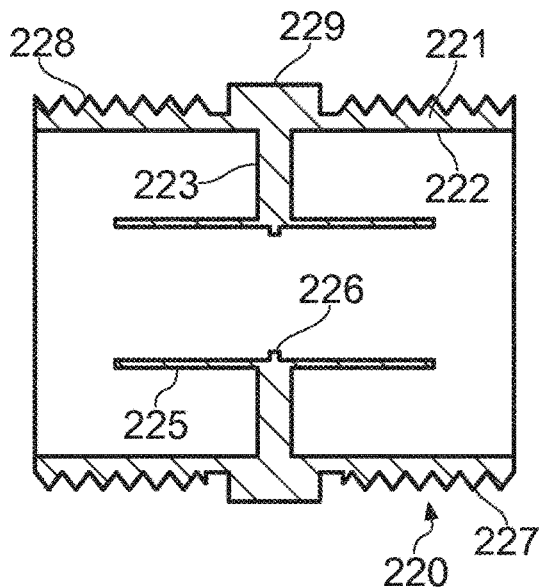
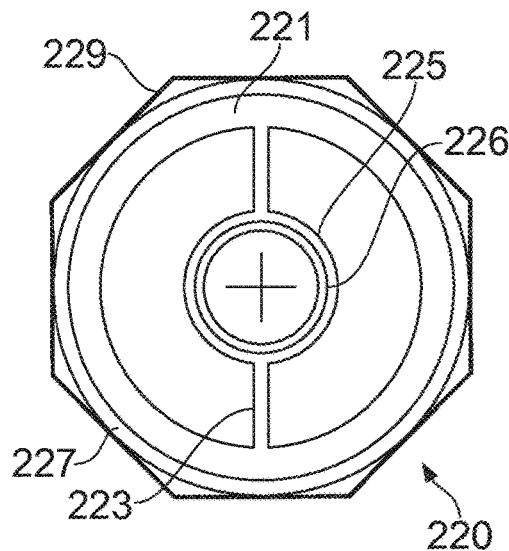
FIG. 10
FIG. 11
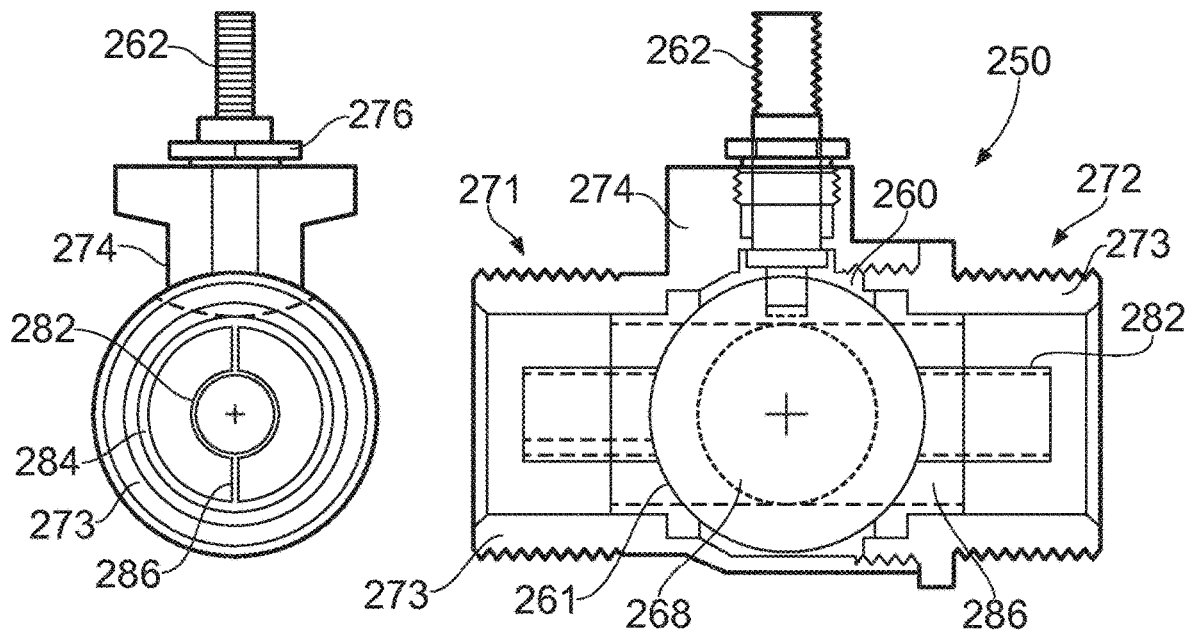
FIG. 13
FIG. 12

WATER SYSTEMS

FIELD OF THE INVENTION

This invention has to do with water systems, particularly hot water systems for use in multi-occupancy or commercial buildings such as hospitals, schools, colleges, hotels, multi-occupancy residential homes and the like. The invention is particularly concerned with improving the sanitary aspects of water systems, especially with respect to avoiding or eliminating harmful bacterial growth in hot water systems. The invention also has proposals for a novel valve and its use.

BACKGROUND

Large-size hot water systems face special demands. On the one hand, it is desirable and sometimes important that adequately-hot water is available at a large number of different outlet user points (such as taps, showers etc.), sometimes simultaneously or in rapid succession. This calls for either a substantial reservoir of heated water or a high direct heating capability. Conversely, because some or many outlets will be distant from the heater, there is a problem during periods of non-use: water cools in the intervening pipes and may have to be run off and wasted in large volumes before hot water emerges.

To address the latter issue it is well-known to provide a circulating system, such as that shown schematically in FIG. 1. A hot water system has a pipe circuit 101 running out from (outflow) and back to (return) a heater 102. The heater may be fed from a cold water storage vessel by gravity, or directly from a cold water supply main at pressure. A pump 103 circulates hot water continuously around the circuit 101 and through the heater so that hot water is always present all around the system. Respective legs or branches 108 lead to the outlets 104 (sink taps, bath taps, showers etc., not specifically shown) so that when an outlet 104 is opened, only a smaller volume of below-temperature water (the volume in the leg 108) runs before hot water emerges.

To maintain a controlled temperature in the system a temperature sensor 105 is provided on the return pipe and connected (e.g. via a transducer or temperature control device 106) to a hot water control system 107 programmed to adjust the heating rate in the heater 102 to ensure that an adequate supply is maintained at adequate temperature.

Heating in the heater 102 is usually by a closed-circuit heat-exchange element heated by fluid circulating via an electrically- or gas-heated boiler.

A prevailing issue in such systems is to avoid the growth of harmful bacterial colonies, such as those of *Legionella* bacteria in particular *Legionella pneumophila*. Potentially harmful organisms such as *Legionella* bacteria are present in most mains water supplies, but do not pose a general health risk unless they form substantial colonies or become particularly active.

*Legionella* bacteria for example are dormant and harmless at temperatures below 20° C. but can form potentially lethal colonies at conventional hot water temperatures between 20° C. and 45° C. At higher temperatures the bacteria are degraded. For example above 60° C. *Legionella* are killed in two minutes, while at 70° C. there is pasteurisation: the bacteria are killed instantly. However such temperatures are not normally achieved or sought in hot water systems, because above 45° C. hot water can be dangerous to users.

Current legal guidelines in the UK require that all hot water storage vessels and plumbing systems comply with the Water Regulations Advisory Scheme (WRAS)—there are equivalents in other countries—generally requiring that all hot water supply (HWS) storage should be at 60° C. and that water delivered at all outlets should be at 50° C. or above, including the "sentinel" outlets i.e. those nearest and furthest from the hot source. Safety for users against scalding can be provided by controlled mixer outlets ensuring mixture with cold water at the outlet point by automatic means, conventionally a thermostatic mixer valve (TMV). However there is still no fully reliable elimination of potentially dangerous organisms in the systems because there are appreciable lengths of pipe between the circulating supply flow and the individual outlets. While safety guidelines warn against "dead legs" in the system, there is no defence against a situation where an outlet is used but only seldom. During periods of general non-use there may sometimes be a cooling of the system. There is still therefore some risk of occasional outbreaks of bacterial infections such as *Legionella* (the infection is usually contracted by inhaling water vapour from running water).

The Invention

We propose various features of a circulating water system which individually and in combination enable more effective measures to be taken to assure a supply of water, especially hot water, at adequate levels in an installation of the kind described, while maintaining sanitary conditions and in particular embodiments inhibiting or avoiding the formation of bacterial colonies. In a separate (but combinable) aspect, we propose a novel valve.

The proposals relate generally to a circulating water system and especially a circulating hot water system with a hot water flow circuit defined by pipework leading out from and back to a pump to drive circulation of the water, and for a hot water system also a heater. The system comprises multiple user points on the flow circuit and at least some of these are outlet user points where an outlet can be opened to take hot water out of the system e.g. at a tap (faucet) or the like.

Some aspects of the invention are set out in the claims. It will be understood from the following description that the present disclosure also contemplates the independent use of some features which are presented in the dependent claims.

A first proposal is that, at least at a branch from the circuit leading to an outlet user point, there is branch circulation provided by communication adjacent to the outlet point between an outflow branch conduit and a return flow branch conduit, the branch return flow conduit returning to the main flow circuit. Preferably the outflow and return branch conduits have a common wall for heat exchange, more preferably one of them is surrounded by the other, more preferably the outflow branch conduit surrounds the return flow branch conduit. By extending circulation along the branches in this fashion, the formation of dead (or near-dead) legs can be avoided.

Another proposal herein is that outflow and return conduits making up the hot water flow circuit have a common wall, preferably one of them surrounding the other, and more preferably the outflow conduit surrounding the return conduit. Accordingly, the flow circuit may be provided as substantially a single run of combined (e.g. mutually surrounding or concentric) conduits, with an end point or return location (where there may or may not be a user point such as an outlet user point) where the outflow conduit communicates with the return conduit which then runs back substantially or entirely along the outflow conduit path. The run may be branched, with plural end points e.g. on different floors of a building. The flow circuit may consist substantially or entirely of such combined conduits, the outflow and return conduits separating at or near the pump and/or heater. This proposal is of course preferably combined with the above proposal of circulation along branches for outlet user points. The branch return flow from an outlet user point then preferably returns into the return flow conduit of the main circuit.

Preferably the outflow conduit surrounds the return conduit because the outflow at high user demand is usually the highest flow for the system, whereas the return flow's primary role is in maintaining system temperature.

Desirably the conduits are pipes made from materials resistant to bacterial growth, such as stainless steel or copper. However subject to requirements it may be possible for one or both to be made from plastics material. Where— as is preferred—one pipe is positioned surrounded by a flow in the other (e.g. concentrically), continuous or intermittent radial support structures may be provided between the pipes, e.g. projecting outwardly from the inner pipe, inwardly from the outer pipe or as discrete elements fitted between them, to hold the inner one in position relative to the outer.

By providing a common wall between the outflow and return conduits, heat loss is reduced and installation may be simplified.

Desirably the pump is provided in the return conduit, and desirably at a position separate from any contact or shared wall of this return conduit with the outflow conduit. The pump may be in the return conduit shortly before it enters the heater. Any suitable pump may be used, in line with conventional knowledge. Preferably it is a pump with controllably variable pumping rate.

When water is taken from the system at an outlet user point, the water taken must be replaced. Our preferred and further proposal is that no hot water storage vessel or reservoir be provided, i.e. that the hot water supply system consists essentially of the circulatory flow. To this end the heater may act directly or in-line on water flowing in a circulation conduit through the heater, rather than heating a substantially static volume in a storage or accumulator vessel. This is a significant difference from prior art circulating systems used in commercial installations.

In another combinable independent proposal a pressurised supply e.g. from a cold storage vessel, but more preferably from a pressurised cold water main, is connected to feed water into the circulating system to compensate for water taken at outlets.

This pressurised supply may be e.g. by a simple connection into the hot water circuit, desirably upstream of the heater, e.g. merging into the return flow conduit. The merger is preferably downstream of the pump when the pump is in the return flow conduit, so that the maximum supply rate is not limited by the pumping capacity, and/or to facilitate interruption of circulation. The supply may be initiated via a simple check valve, responding to pressure drop in the circuit when an outlet is opened.

Combination of various of the above proposals thus enables a system in which no static (or substantially static) volumes of water are held or stored at raised temperature. This can prevent the growth of bacterial colonies, as well as saving energy. By providing a suitable heater of sufficient power an adequate supply of hot water at essentially mains pressure, or at the supply pressure/rate of the cold supply, can be available at all times. The heater type is not specifically limited. The required heating power output will depend on the size of the system and on the anticipated maximum flow demand. The heat output is preferably controllable or adjustable in operation.

Examples of suitable heaters include electrically-powered or combustion fuel instant (non-storage) heaters; other types may be used. One particular suitable type is a gas-fuelled (e.g. natural gas or propane) heater using exhaust heat to pre-heat the incoming water flow.

Preferably a sensor is provided to detect when cold water or water below the predetermined circulation temperature is being fed into the circulating system. This may be e.g. a flow sensor in the supply conduit, or a sensor for detecting opening of a valve or the like. Such a sensor can be connected to a control system to adjust the output of the heater in accordance with need.

A further novel proposal herein is the provision of a shut-off or flow restrictor for the return conduit, operable to stop or restrict return flow when water is taken out at an outlet user point. For example one or more sensors may be provided to detect opening of an outlet, or flow at an outlet, or flow (or cumulative flow for plural outlets) above a certain threshold level, a control system being operative in response to this to actuate a flow restrictor or shut-off, such as a closure valve on the return conduit, so that return flow slows or stops. Hot water supply to the open outlet(s) derives initially from heated water already in the circuit, but can be directly from the external supply (e.g. cold gravity vessel or cold mains supply) via the heater and outflow conduit to the open outlet(s) under the external supply pressure. The circulation pump may be stopped or slowed in this condition. This can save energy and improve the rate or pressure of supply to the open outlet(s).

Desirably a shut-off or restrictor valve for this purpose is provided in the return conduit before it reaches the heater. Where an external supply merges into the return conduit, the shut-off valve should be upstream of the point of merging. It should be downstream of the circulation pump, and desirably adjacent to it. For ease of access it is preferably at a part of the return conduit which does not share a wall alongside the outflow conduit.

An external supply such as a cold water main may feed into the heater along an inlet separate from the return conduit, merging into the flow conduit in or after the heater, but for simplicity it is preferred that it joins into the return conduit before the heater.

A further option herein is that shut-off valves be provided for isolating both the return conduit and the outflow conduit from the heater and/or from an external supply conduit. An isolation valve may indeed be provided for shutting off both outflow and return pipes at the same location, when these pipes are provided as a unitary e.g. concentric pair as proposed herein. For this purpose we may use a ball valve in which the movable element comprises separate flow segments corresponding to the outlet conduit and return conduit and respectively registering with these in the open position, whereas when turned to the closed position the moveable body of the ball valve blocks both conduits.

Valve Invention

A particular construction of isolation valve for a water system or other fluid/liquid system having concentric conduits is an independent aspect of our proposals herein. Thus, we propose a ball valve in which the movable closure element (ball element) may comprise an outer tube with an external spherical surface portion and an inward surface defining an outer conduit, and an inner tube coaxial with the outer and supported inside it by a support structure such as plural circumferentially-spaced struts, fins or axially-extending walls. The fixed structure of the valve includes first and second sealing portions to seal against and around the respective oppositely-directed ends of the moveable element (ball element). Usually the valve is a discrete unit to be coupled into adjacent lengths of union and having inner connector or union portions to slide into or around the inner pipes of the conduit, and outer tubular unions to slide into or around the outer pipes of the conduit. These coupling structures may be comprised in or contained within a valve body (housing) which also carries an external operating member through which the moveable element can be turned between open and closed positions. In the closed position the spherical surface portion of the outer tube closes off at least the outer flow conduits, usually at both sides of the valve. In the open position, it is not critical that a specific resilient seal or deformable sealing member is provided for the connection between the inner tube of the moveable element and the inner tube (or tubular union) of the adjacent fixed part. Indeed, a further option is for the closure member surface to be recessed away from the inner tube (or tube union) ends so that there is substantial flow communication between the inner and outer conduits on the same side of the closed valve. This allows for circulating flow to continue to one side of the closed valve, according the principles described herein.

Plural isolation valves may be provided to enable isolation of multiple different conduit runs, e.g. for maintenance or for handling a leak. For example isolation valves may be provided enabling each user outlet to be isolated from the others. Such isolation valves may be provided in respective branch conduits.

System Control

The present system desirably comprises a programmed control system. Elements of the control system, and programmed regimes in which it is operable, are now described. A water system of any type disclosed above is proposed in combination with such a programmed control system.

Generally the control system comprises at least one temperature sensor for detecting the temperature of water flow. There may be a sentinel temperature sensor for detecting the circulating flow temperature at a most remote point (or most remote user point) of the system, for example where the outflow conduit communicates with a return conduit where these run side by side e.g. as proposed above.

There may be a return temperature sensor for measuring the temperature in the return conduit shortly before it enters the heater, e.g. after a pump, typically downstream of or at the end of any region where the return conduit interacts with the outflow conduit. There may be individual outlet or user point temperature sensors at one or more user points. There may be a supply temperature sensor for measuring the temperature of supply water fed to the circulating system e.g. from a main or cold vessel. Outputs from such temperature sensors are fed to a programmed control processor, via an appropriate transducer if necessary. The control processor is programmed to be able to adjust the operation of any or all of: the pump (on or off, or adjust flow rate or output power), the heater (on or off, or adjust heating rate), a flow restrictor or closure valve (open, shut, or partially open to a predetermined degree) in dependence on any one or more of the above outputs from temperature sensors.

The control system may comprise one or more flow sensors e.g. to sense the presence, absence or rate of flow in the circulating system, and/or at an outlet thereof, and/or in or from a supply for external water such as a supply main as discussed above. Again, outputs from such sensors are fed to the programmed control system which may be programmed to operate or adjust any of the heater, pump or closure valve or flow restrictor in dependence on the detected outputs. In particular, as mentioned, the system may be programmed to respond to consumption of hot water from the system, detected as flow at or near an outlet user point or with reference to the external supply, by actuating a shut-off valve or flow restrictor for the return conduit as discussed above. The control processor may be programmed to increase the power output of the heater in dependence on detected increased flow rate in the circulating system and/or in the external supply conduit e.g. above predetermined threshold values or on a continuously variable basis.

The control processor may be operable in a stasis mode—corresponding to circulation of heated water through the hot water flow circuit and heater without consumption at the outlets—and a distinct dynamic mode when hot water is consumed at one or more open outlet user points.

In the stasis mode, the control processor is operable to maintain a predetermined flow rate—preferably corresponding to laminar flow—and a predetermined operating temperature in the circulating flow at least with reference to one or more predetermined points, e.g. at least at a final sentinel temperature sensor and/or at a return temperature sensor. These may be set as a minimum temperature in the system, the controller being operable to modulate the heater output and/or to reduce the flow rate in the event that the detected temperature drops below the predetermined minimum. Desirably the program is operable to maintain a return temperature sensor temperature of 50° C. or above.

The control processor may also be programmed to operate in an exceptional stasis mode or pasteurisation mode in which flow rate and/or heater output are adjusted to achieve an exceptional raised minimum temperature such as 60° C., 65° C. or 70° C. By these means it is possible e.g. to carry out a precautionary decontamination or pasteurisation of the system from time to time to ensure that no bacterial colonies can establish. The system may be programmed to operate this mode only in special maintenance periods or periods of non-use, or subject to a warning or precautionary non-availability or hot water at the outlets. In any event the system desirably comprises thermostatic or other automatic mixing devices at the outlets, for mixing with cold water to approximate a target temperature or prevent exceeding a maximum temperature, to maintain safety.

The control processor may be programmed to switch the system from the stasis mode to the dynamic mode when outlet flow is detected, e.g. at a respective outlet or by means of detection of flow in or from an external supply system. The dynamic mode may involve stopping or slowing the pump and/or shutting off or restricting circulating flow, especially return flow before the heater, so that flow at the outlet(s) proceeds under pressure primarily or solely from the external supply. The heating rate may in this case be adjusted in dependence on a detected temperature at a predetermined point in the hot water circulation system, e.g. at the open outlet, at a sentinel outlet, and some other predetermined point on the system, and optionally also on a detected temperature or control and/or flow rate of the external supply. When outlet flow stops, as detected by any flow sensor as mentioned, the control processor may automatically revert to the stasis mode e.g. by opening a shut-off valve or flow restrictor, turning on or accelerating the pump and adjusting the heater output to maintain a target temperature corresponding to the stasis mode.

A further option is for the control processor to be operable in a dormant mode in which the pump is turned off and/or flow is shut off with no circulation, and/or in which heating is turned off or reduced to a reduced predetermined level corresponding to a dormant temperature below the predetermined operating temperature or minimum temperature mentioned above. In particular, a dormant mode with neither circulation nor heating is envisaged. The system may be programmed to initiate or allow the dormant mode after running the pasteurisation mode, when there should be no viable biological activity in the system. The dormant mode may be programmed to run for a predetermined period, or during a certain time of day, and/or until there is use of water at a user point, triggering return to the dynamic or stasis mode. Availability of an appropriately programmed dormant mode can save energy without compromising safety. This is not a feature of existing systems which, even if they could be run at pasteurisation temperatures, lack full circulation (i.e. they have dead legs) so that actual pasteurisation is not achievable and correspondingly a dormant mode cannot safely be used.

If water is—perhaps unexpectedly—taken from the system while in dormant mode, the controller may be programmed to provide a dormancy interruption mode—a form of transition to a dynamic mode—in which on detection of the outlet flow the pump remains stopped and circulating flow remains shut off by the valve, but the heater is turned on to heat incoming cold water directly to 60° C. or more.

DESCRIPTION OF EMBODIMENTS

Examples of the invention are now described, with reference to the accompanying drawings in which FIG. 1 is a schematic diagram of a conventional circulating hot water system as already described;

FIGS. 10 and 11 are respectively longitudinal and transverse cross-section through a slide coupling;

FIGS. 12 and 13 are respectively longitudinal and transverse sections through a first embodiment of isolator valve;

Figure 15A:
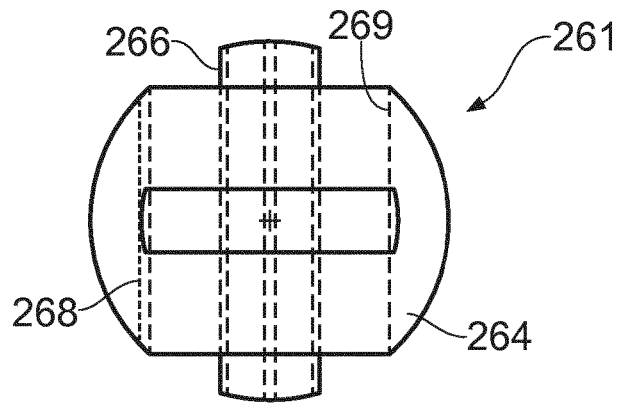
Figure 15C:
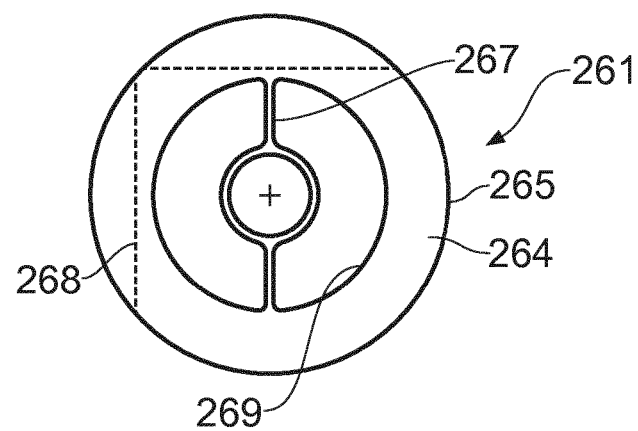
Figure 15B:
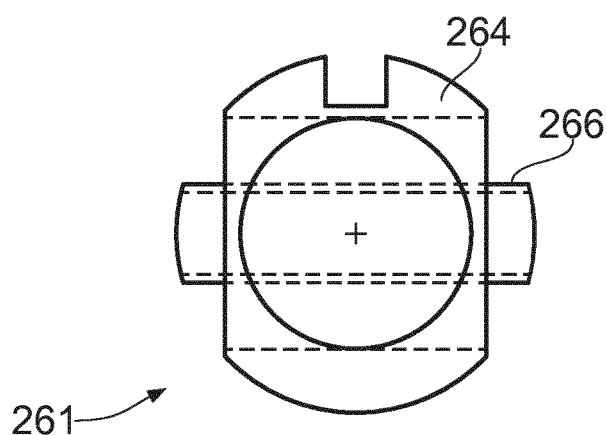
Figure 16B:
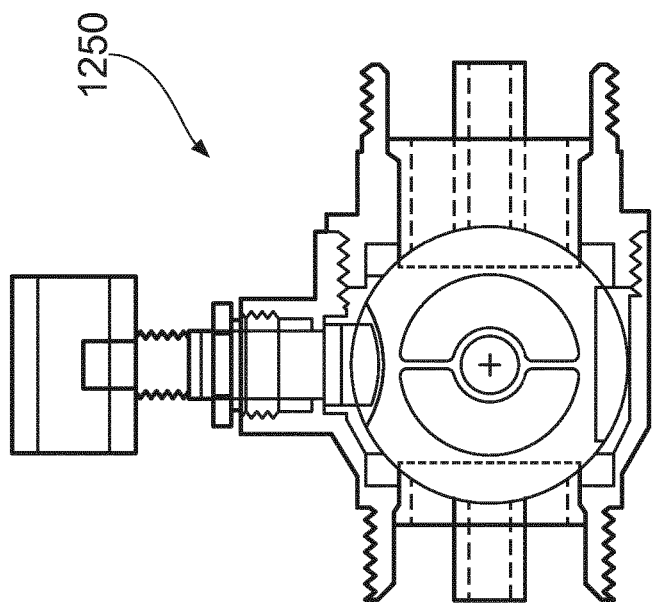
Figure 16A:
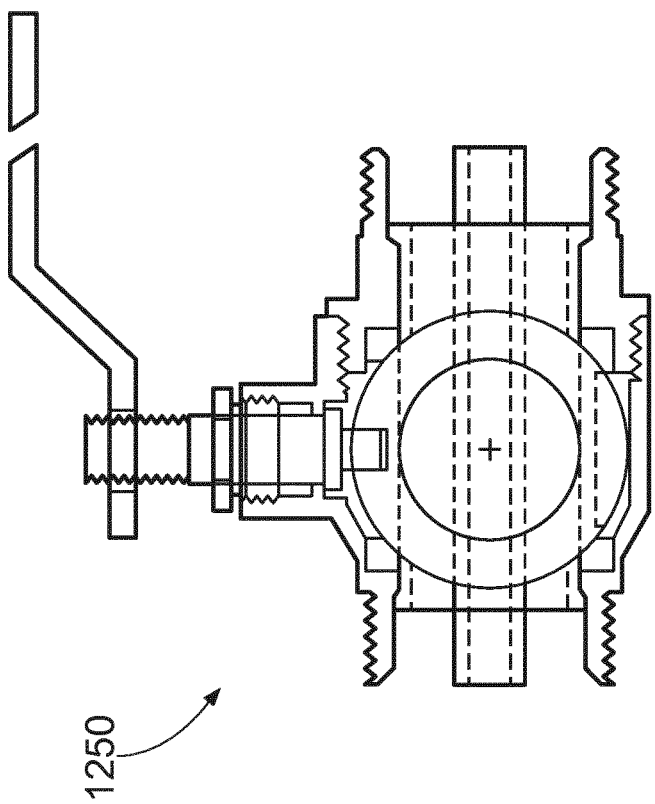
Figure 17:
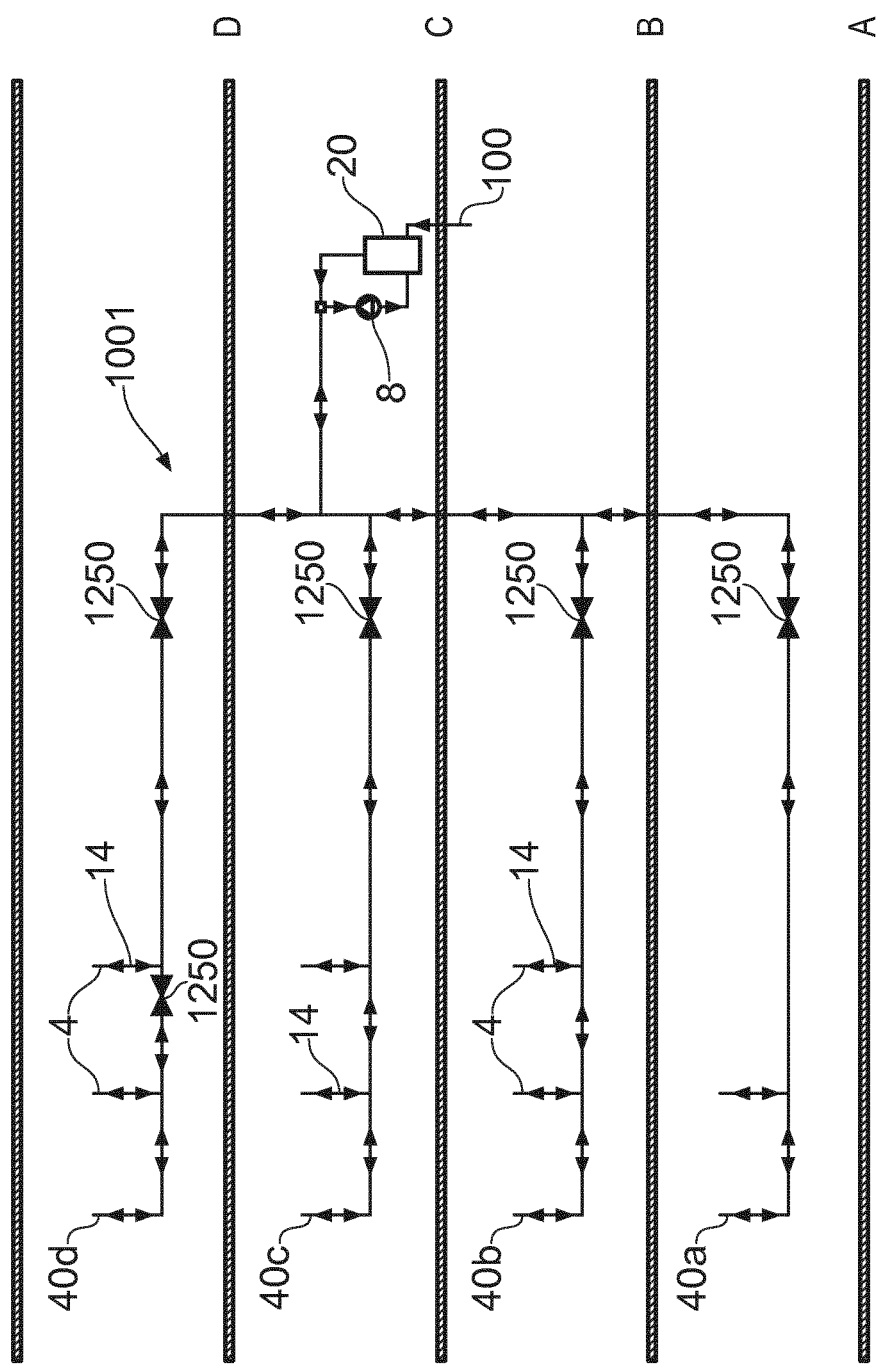

FIGS. 15(a), 15(b) and 15(c) are respectively a top view, end view and side view of a rotary component of the valve;

FIGS. 16(a) and 16(b) are longitudinal sections through a second embodiment of isolator valve in closed and open positions, and FIG. 17 shows schematically a possible disposition of isolator valves in a water system serving multiple floors in a building.

DETAILED DESCRIPTION

Figure 1:
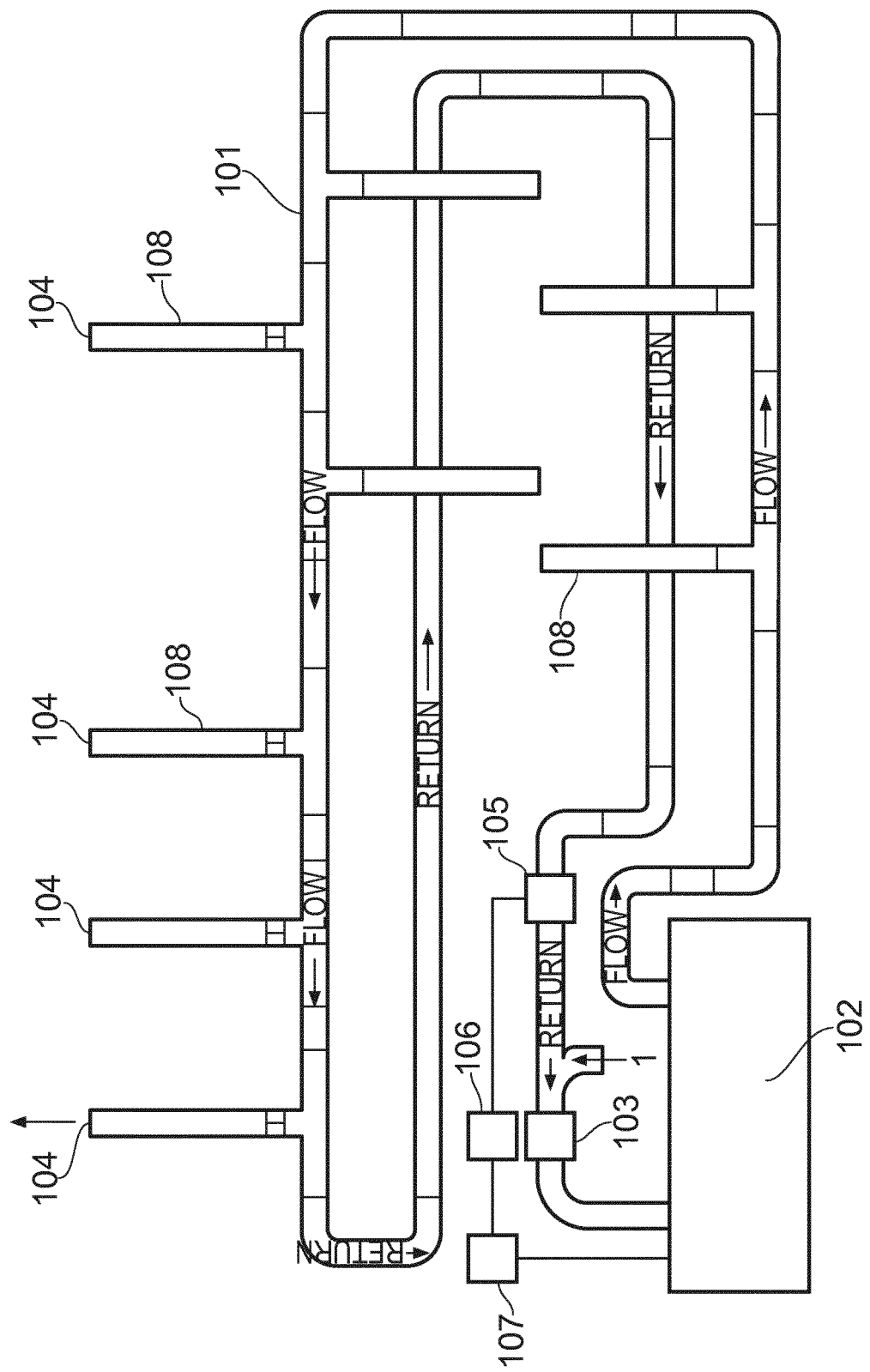
Figure 2:
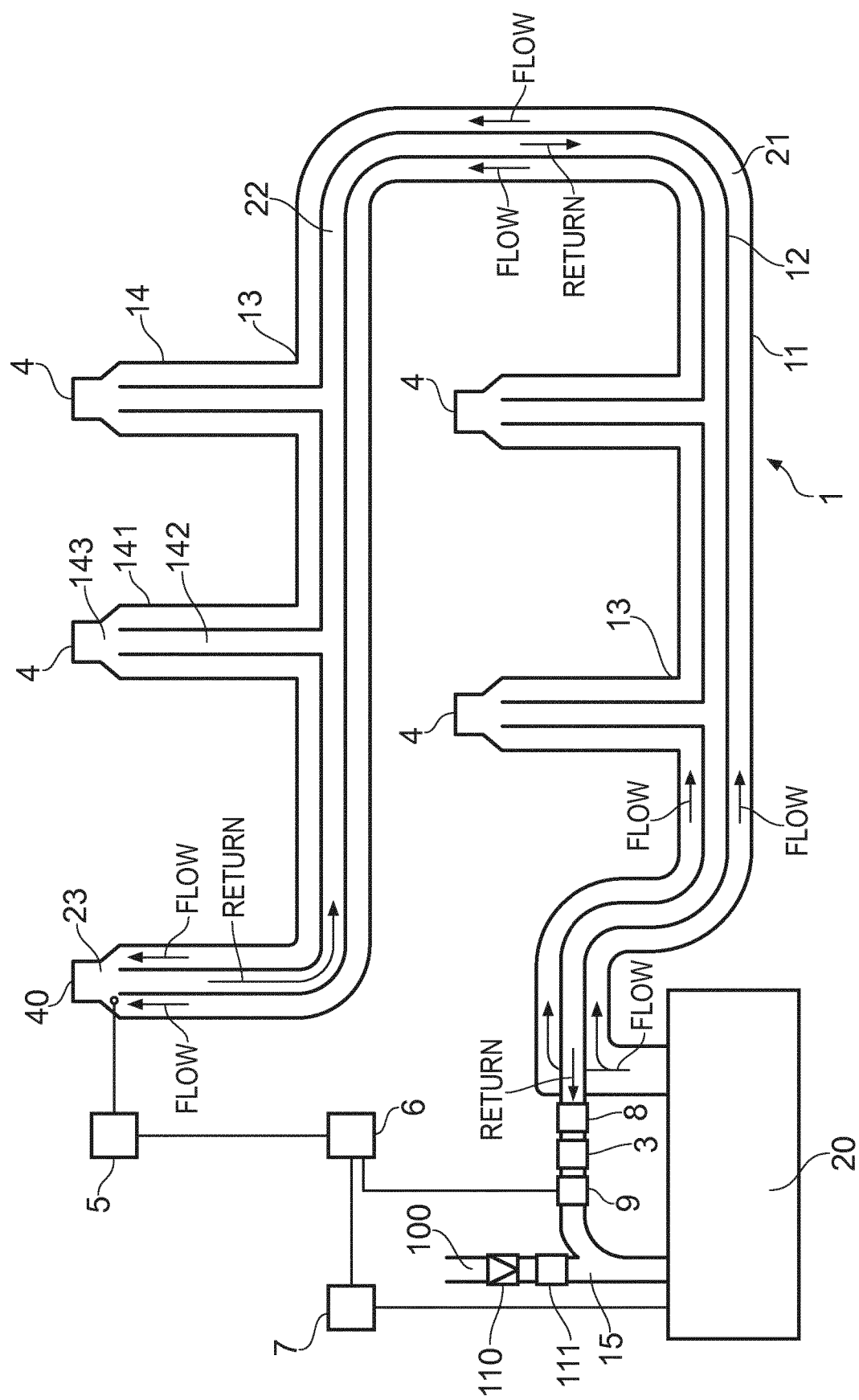
FIG. 2 is a corresponding schematic diagram of a first hot water system embodying our proposals, operating in a stasis mode.
Figure 3:
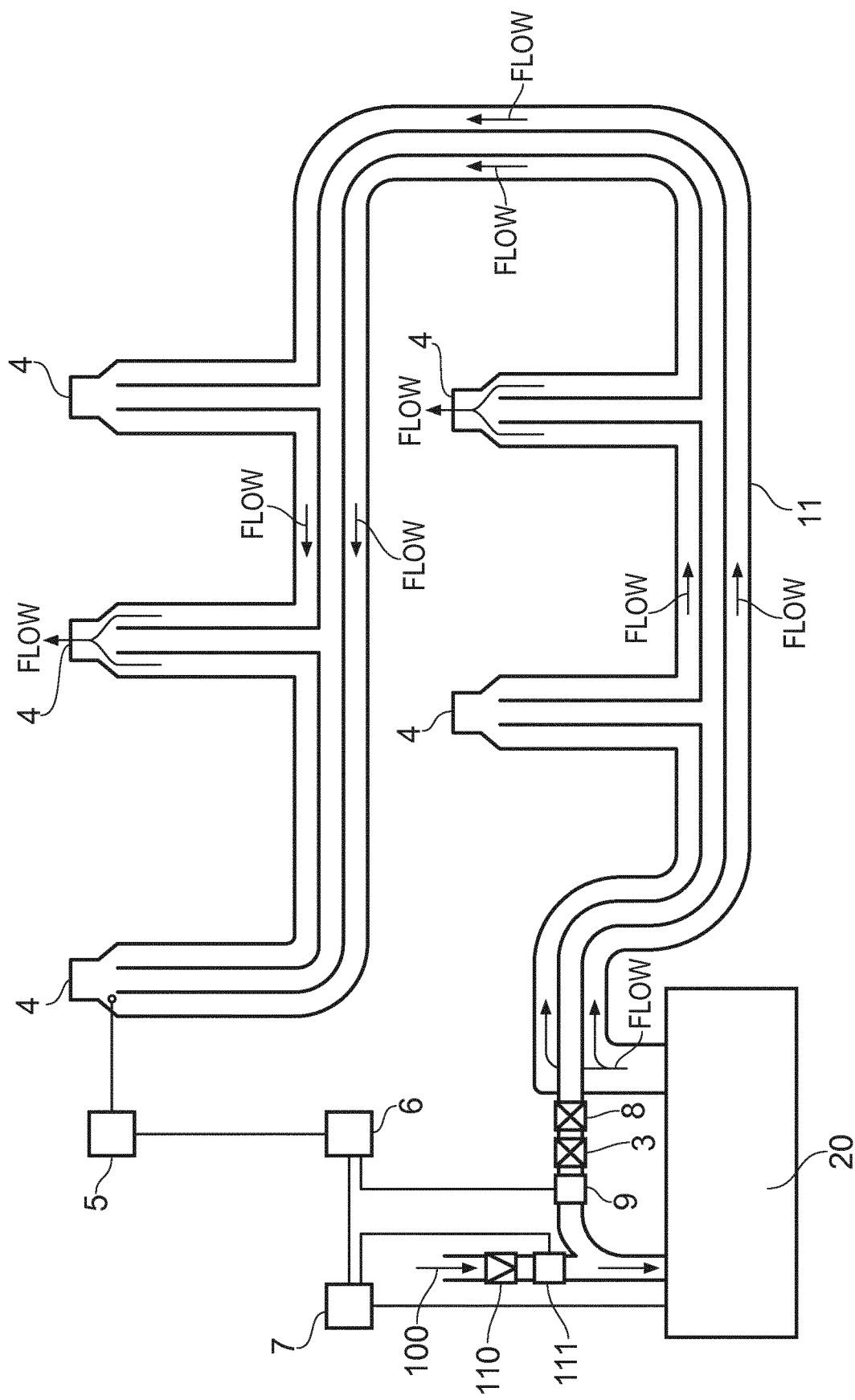
FIG. 3 shows the FIG. 2 system operating in a dynamic mode.

Referring firstly to FIGS. 2 and 3 showing the first embodiment, a hot water system comprises a circulation system 1, a heater 20 and a programmed control 7.

The main elements of the circulation system 1 are an outflow pipe 11 for outward flow of heated water from a heater 20 (or multiple heaters, if needed for higher power output), along an outflow channel 21, and a return pipe 12 of substantially smaller diameter extending concentrically along inside the outflow pipe 11 and defining a central return channel 22. Preferably these pipes are of copper or stainless steel. They are of generally circular cross-section, and the return pipe 12 is mounted concentrically inside the outflow pipe 11 by means of suitable support structures, not shown, examples of which are described later. An insulative jacket or lagging is provided around the hot water circulation system 1 to reduce losses; again this is not shown.

At the most distant point from the heater 20, the inner return pipe 12 finishes short of a terminus of the outer pipe 11 so that the two communicate via a main return opening 23. This terminus may be a blank terminus or may have an outlet or other user point. A series of outlet user points 4 such as taps is provided on respective pipe branches 14 from the main circulation system 1. At each branch point 13 both the inner return conduit 12 and the outer flow conduit 11 have a branch or T-piece, and the branch 14 to the outlet 4 then has an outer branch outflow conduit 141 and an inner concentric branch return conduit 142. The inner return portion 142 terminates short of the outlet 4, providing a branch return opening 143 where the flows of the inner and outer tubes and the outlet all communicate without dead space.

Near the heater 20, the return pipe 12 emerges through an elbow of the outer pipe 11. The exposed return pipe there has an electrically-driven pump 8 for driving the circulating flow, a control valve 3 and a return temperature sensor 9 before re-entering the heater 20.

The heater is a continuous or in-line type instant heater which heats the water flow conduit directly before it emerges as the outflow conduit 11. For example, a gas-fuelled condensing (exhaust pre-heating) heater with adjustable and switchable output is suitable.

A sentinel temperature sensor 5 detects the circulating water temperature at the turnaround point 23 between the outflow and return conduits at the most distant point 40 of the circulatory system, and feeds this information to the control processor 7 (e.g. a programmable logic controller) via a transducer 6. The temperature sensed by the return sensor 9 shortly before the return flow re-enters the heater 20 is also fed to the control processor 7. The control processor 7 is connected and programmed to control the adjustable output of the heater 20, and also to control the pump 8 by turning it on or off and/or by modulating its pumping rate. A pump with variable rate, controllable e.g. via a built-in VSD (inverter) is suitable.

An external cold water supply conduit 100, in this case a pressurised mains water supply, enters the return pipe 12 at a junction 15 shortly before it re-enters the heater 20. A check valve 110 permitting only forward flow is provided in the supply conduit 100, and a flow sensor 111 immediately downstream of this detects when there is flow from the supply 100 into the circulation system. The flow sensor 111 is connected to the control processor 7.

In the stasis mode shown, all of the outlets 4 (taps etc.) are closed and the control processor 7 is programmed to maintain the temperatures (as assessed at the sentinel sensor 5, the return sensor 9 or other strategically located sensor) within predetermined acceptable ranges, such as a minimum of 50° C. and a maximum of 60° C. For a pasteurisation mode, the temperature may be controlled at 70° C. or above. The processor 7 controls the heater output and/or pump rate with appropriate feedback to maintain the temperature accordingly. The system is full of water at full pressure, so no water enters through the external supply conduit 100 from the mains, the check valve 110 remaining closed and the flow sensor 111 detecting no flow.

In the stasis mode heated water flows in a generally laminar flow out along the annular cross-section outflow channel 21. This includes flowing out along the outflow tube of each branch 14, and back along the return conduit 12 with flow along the subsidiary return branch conduit portions 142 of each of the branches 14, since flow pressure differences prevail at each of the branches as they do at the terminal point 40. Because the return pipe is surrounded or jacketed by the outflow pipe, heat losses are reduced and may be further reduced by appropriate lagging or other insulation of the pipe system including its branches. Laminar flow in the stasis mode reduces vibration, other noise and wear in the pipes. It can be provided by programming to adjust the pump rate down (adjusting the heating rate up if necessary) to below a predetermined flow rate limit, when the desired temperature is achieved for the stasis mode. In dynamic mode the flow rate may be higher according to demand.

Each outlet 4 is provided with an appropriate mixer tap, such as an automatic (thermostatic) mixing device to prevent inadvertent scalding by mixing with cold water from the cold water supply (which is not shown, and may be a conventional supply direct from a pressurised main).

FIG. 3 shows the FIG. 2 system when two of the outlets (taps) 4 have been opened and hot water is flowing out. Because water leaves the system the pressure drops and water flows in through the supply main 100, opening the check valve 110 and activating the flow sensor 111. The control processor 7 responds by stopping the pump 8 and closing the shut-off valve 3 immediately downstream of the pump, thereby closing off the return flow. The flow is then a direct flow of cold supply water under mains pressure into the heater 20 where it is heated and passes into the outflow conduit 11 and to the open outlets 4, for as long as needed. There is no return flow, so the energy from the heater is devoted to the active outlets. When use is finished and all outlets are closed, the pressure in the circulation system 1 returns to mains pressure, the check valve 110 closes and the flow sensor 111 is deactivated causing the control processor to revert to the stasis mode, opening the return shut-off valve 3 and turning on the pump 8.

The system controller (in this example and in general) may be programmed to provide a limited use reservation, whereby when an outlet is opened the system remains in the stasis mode unless and until water use exceeds a preset threshold parameter of flow rate, time and/or volume e.g. as detected using the flow sensor. This can avoid unnecessary powering-up of the heater and/or interruption of the pump in the event of minimal uses. Such a system desirably uses a positively actuated (rather than passive, flow/pressure-actuated) shut-off valve 3 to control its operation in tandem with the pump 8.

Figure 4:
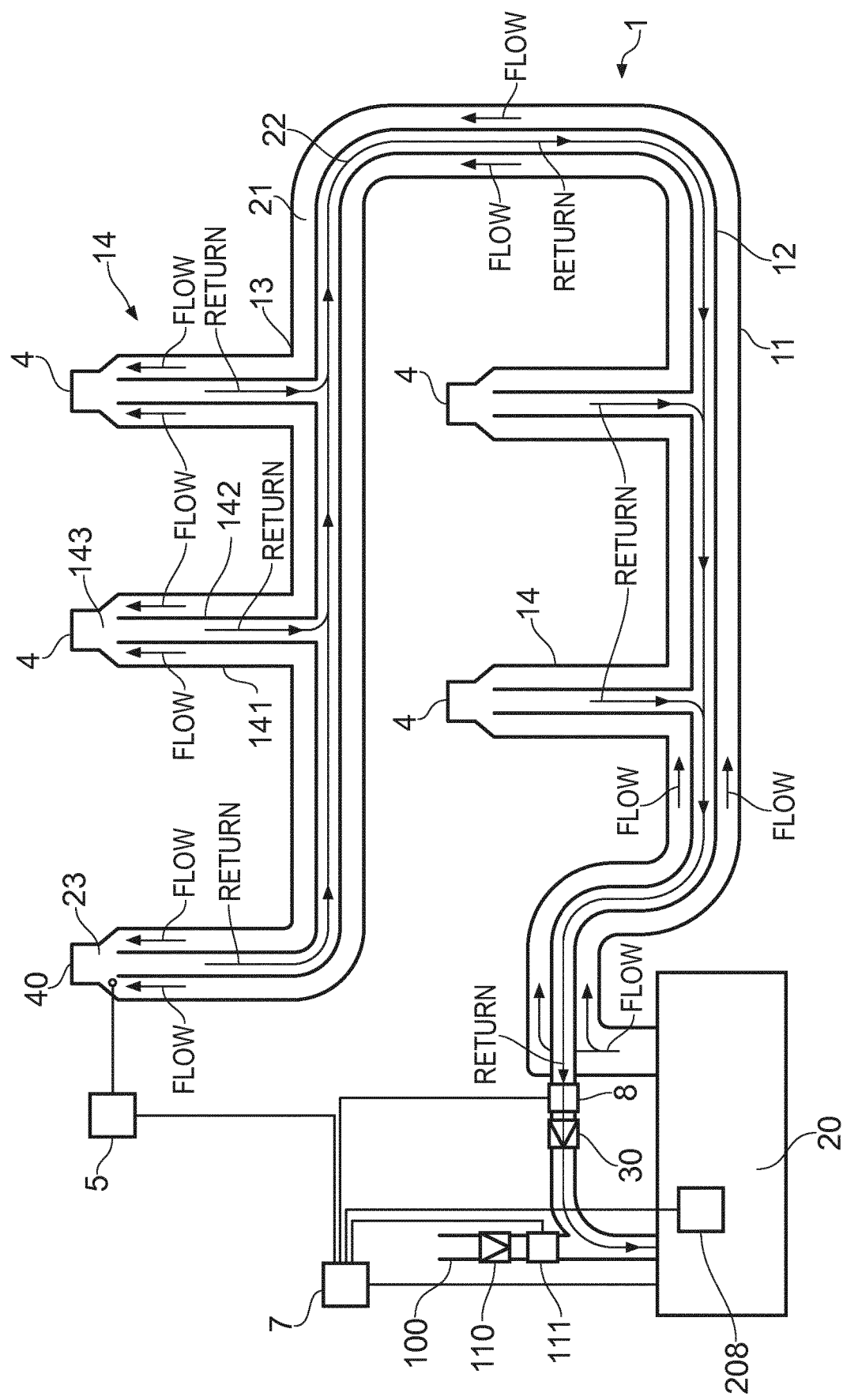
FIGS. 4 and 5 show a second embodiment of hot water system, in stasis mode and dynamic mode respectively.
Figure 5:
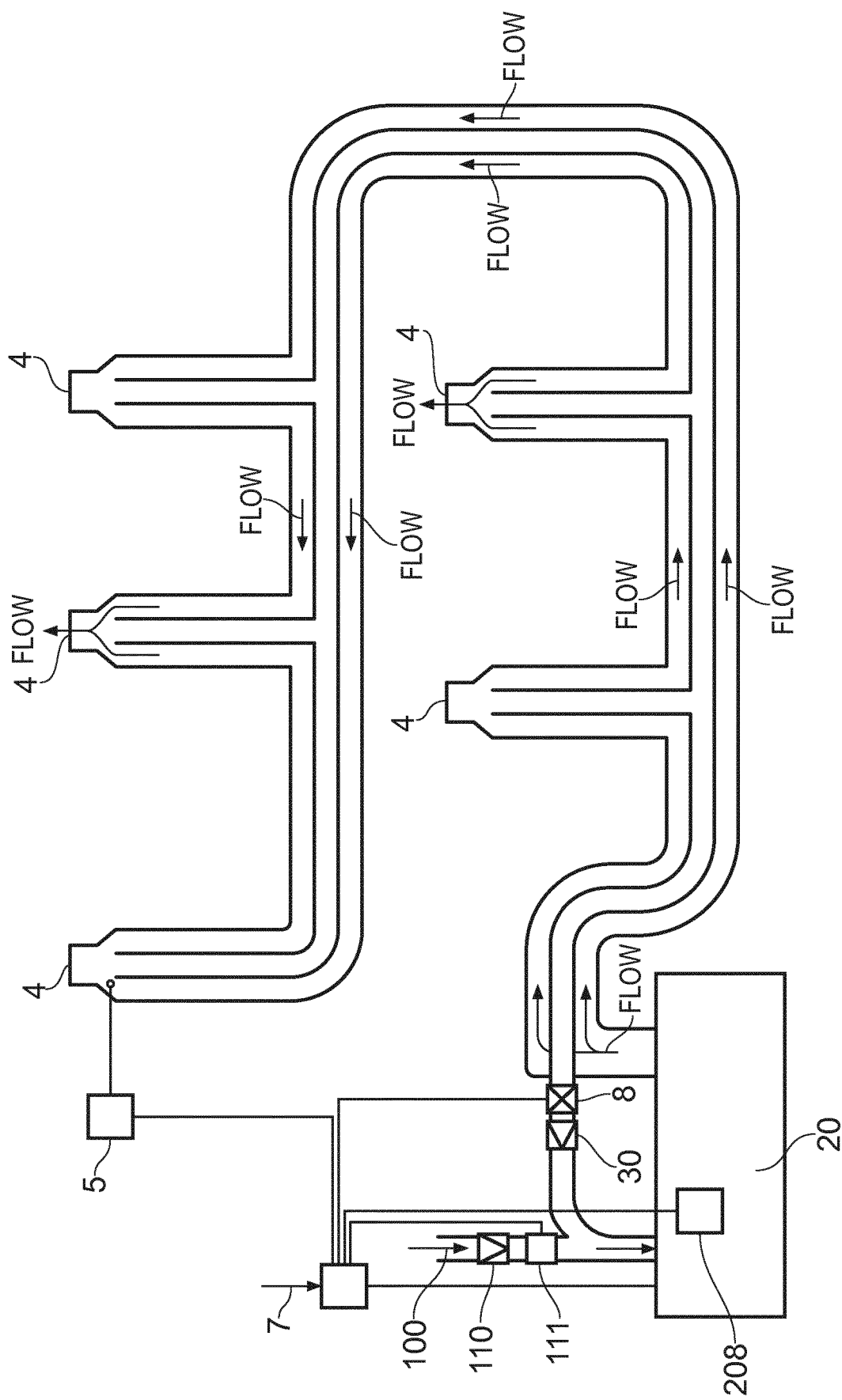

FIGS. 4 and 5 show respectively the stasis and dynamic modes of a second embodiment. Most components of the system correspond to those of the first embodiment and have the same reference numerals.

An additional feature in the second embodiment is a heat source thermostat 208 detecting the water temperature in the heater 20, and connected to the control processor 7. [In this embodiment the sensors are matched to appropriate input transducers comprised in the control processor 7 so no separate transducer is shown.] The temperature sensor 208 (thermostat) in the heater 20 takes the place (functionally speaking) of the return temperature sensor 9 of the first embodiment. Immediately downstream of the pump 8 a passive mechanical check valve 30 is provided (instead of the positively controlled shut-off valve 3 of the first embodiment).

In the stasis mode of FIG. 4 the outlets 4 are all closed, the pump 8 circulates liquid and the process control 7 determines whether the water temperatures measured by the sentinel temperature sensor 5 and the heat source thermostat temperature 208 are within the set parameters. If they are not, the controller modulates the power output of the heat source 20 to bring the temperature within the set parameters. This is similar to the first embodiment, except for the disposition of the temperature sensor 208. When one or more outlet user points (taps) 4 are opened, as shown in FIG. 5, as in the first embodiment the circulation system pressure drops and cold water under mains pressure enters along the external supply conduit 100 through the check valve 110 and past the flow sensor 111 which is duly activated. Detection of flow sensor activation switches the control processor 7 to the dynamic mode and it stops the pump 8. In this second embodiment the return flow substantially ceases (because the pump stops) and any reverse flow—which would obviously be undesirable—is prevented by the passive check valve 30 in the return conduit, without use of a positively controlled shut-off seen in the first embodiment. The substantial result is the same, namely a direct supply from the external main via the heater 20. However a positively controlled valve 3 as in the first embodiment may have some advantages, such as less flow obstruction in the open position and the ability to react to parameters or signals other than flow.

Figure 6:
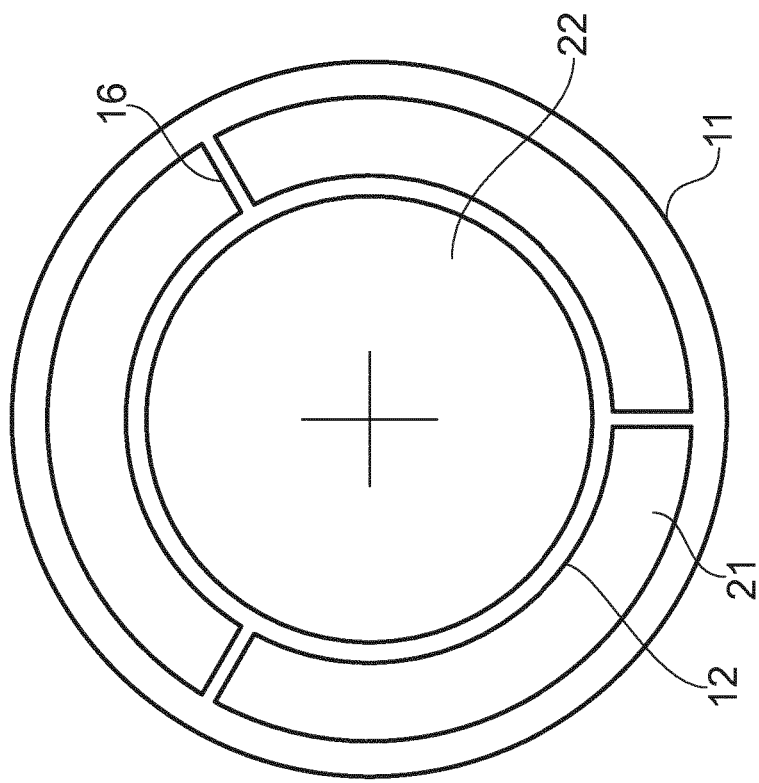
FIGS. 6 and 7 are schematic sections showing alternative dispositions of concentric flow conduits.
Figure 7:
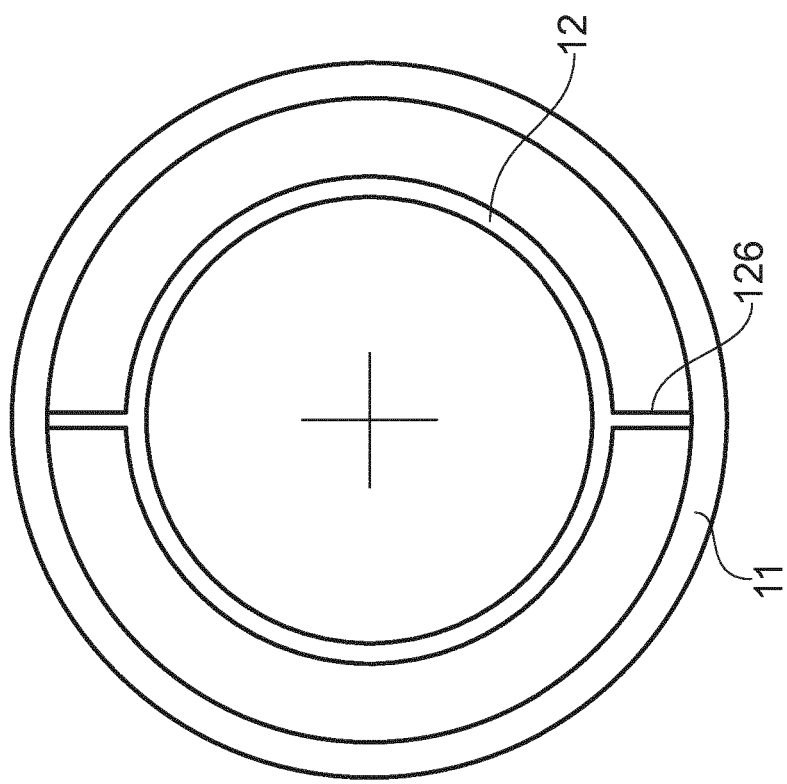

FIG. 6 is a schematic cross section showing concentric inner and outer pipes 12,11 defining the cylindrical return channel 22 surrounded by the annular-section outflow channel 21. Radial supports 16 extend between the inner and outer pipes to maintain their relative positions. FIG. 7 shows a convenient manner of implementing support without complicated manufacture or assembly, by providing integral opposed lobes or flanges 126 on the inner tube 12 which match the inner diameter of the outer tube 11, so that the inner tube 12 is held substantially in the middle of the outer. These lobes or fins 126 may be vertically oriented to maximise the support. Other means of providing nested or concentric pipes may be used.

Figure 9:
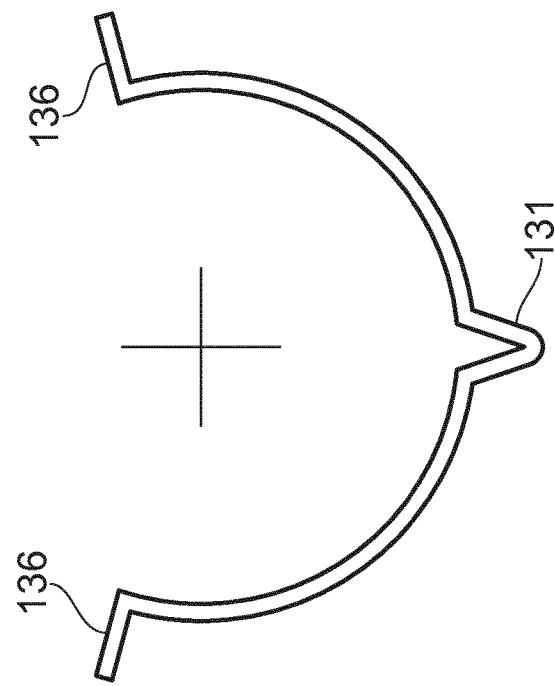
FIGS. 8 and 9 show open and operational configurations of a spacer clip for mounting an inner conduit in an outer conduit.
Figure 8:
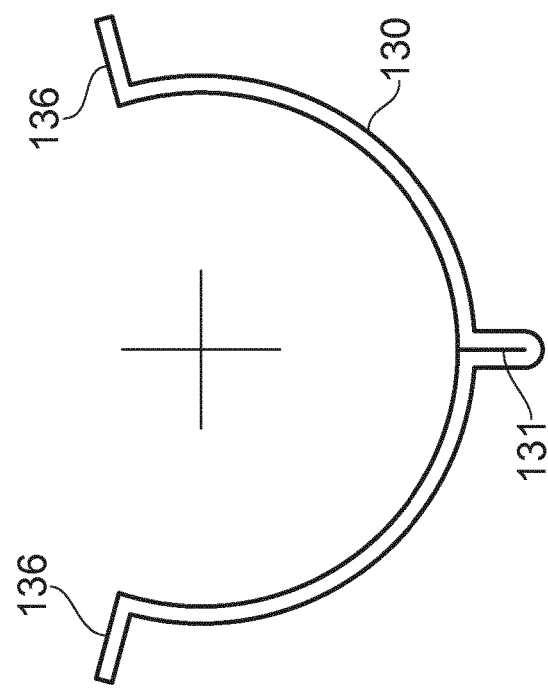

FIGS. 8 and 9 show a further option, in the form of a discrete spacer clip 130. The main part of the clip is a part-cylindrical metal strap dimensioned to grip resiliently around the inner pipe (not shown) with some deformation, as in FIG. 9 indicating a base hinge portion 131 slightly forced open. The opposed ends of the strap have projecting flanges 136 whose extremities, with the bottom of the projecting hinge portion 131, abut against the interior of the outer pipe to keep the inner pipe at a suitable spacing. A series of these spacer clips 130 is provided at intervals along the pipes.

FIGS. 10 and 11 show a convenient coupling 220 for connecting adjacent lengths of the concentric (coaxial) double pipe 11,12. The coupling 220 is a one-piece unit with an outer tube 222 connected to a coaxial inner tube 225 by a pair of opposed internal support struts 223. Each of the inner and outer tubes 222, 225 presents oppositely-directed open ends, to receive slidingly the ends of respective sections of outer (outflow) pipe 11 and inner (return) pipe 12. The outer tube 222 has external threads 227 at each end for clamp rings, not shown but of known type and which include compressible external seals, to grip and seal the assembly. The outer tube also carries an exterior central tool surface 229, such as a polygonal nut form to help tighten the clamp rings. The inner tube 225 has, half-way along its interior, an inward annular projection 226 which functions as a pipe stop. In use, the respective pipes 11,12 to be joined can quickly be slid into engagement with the respective inner and outer tubes of the coupling 220 which is then tightened into sealing engagement with the outer pipe. No special sealing is required for the inner pipe, because the pressure difference between the two conduits is modest and slight leakage is of no consequence.

FIGS. 12 to 15 show details of a ball valve 250 which can be used as an isolator valve for temporarily separating or isolating different sections of the concentric (coaxial) flow conduits from one another, e.g. for maintenance or repair. In particular we envisage that one of these valves 250 may be provided on each branch leading to a user point.

The isolator valve 250 is a quarter-turn ball valve consisting essentially of a body or housing 270 and a rotatable closure member 260. The body 270 consists of a main body portion 271 and a retainer body portion 272. Each body portion 271, 272 comprises a tubular outer union 273 sized to receive slidingly an end of a respective outer pipe 11, with an external thread for the sealed securing of the outer pipe. The main body portion 271 defines an interior cavity for the ball 261 of the closure member 260, and the bonnet 274 of the valve which includes a packing seal 275 and retaining nut 276 for the actuating spindle 262 of the closure member 260. Actuation may be manual, or automated e.g. by any conventional drive. The body retainer portion 272 screws into the main body portion 271 to enclose the valve mechanism and hold the components in place. An opposed pair of seat union components 280 are retained in this cavity, held between the body portions by external flanges 285, and these provide both peripheral seals (seats) 281 for sealing around the ball 261 and central inner union tubes 282 for sliding connection with the inner (return) pipes 12 of the circulation system. The seat union components 280 have outer tubular extensions 284 fitting into the outer union tubes 273 of the body portions whose internal diameter matches that of the outer pipes, and the end surfaces of these extensions provide stop abutments for the outer pipes. The inner union tubes 282 are mounted concentrically in the seat union components 280 by support members 286 (see FIG. 13) in the form of short walls or fins extending axially to minimise flow obstruction. Two opposed fins are shown; other numbers and shapes may be used.

Figure 14:
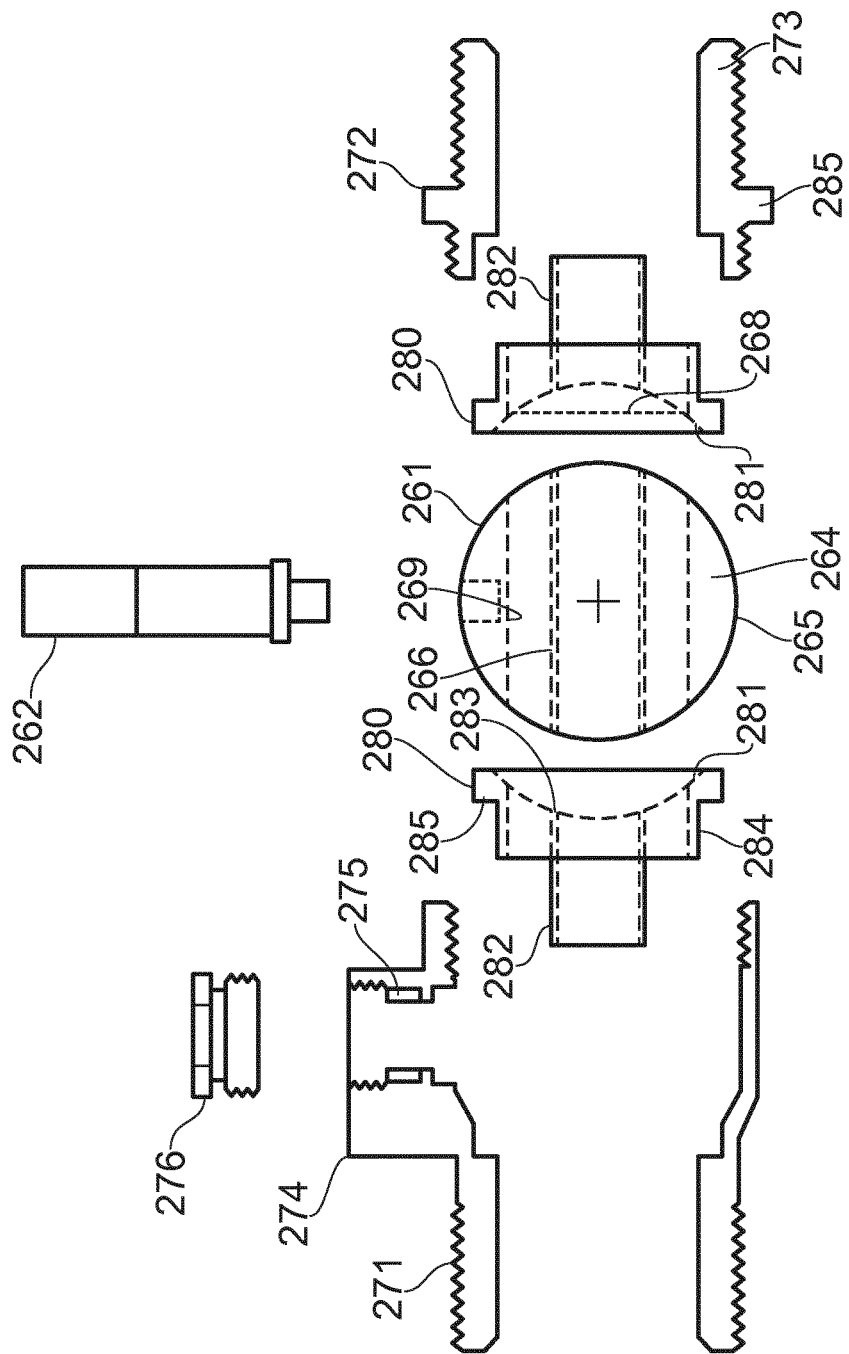
FIG. 14 is an exploded view of the isolator valve.

FIGS. 14 and 15 show that the ball member 261 consists of a main outer tube 264 having a spherical outer surface 265 and a cylindrical inner surface 269 facing onto an inner tube 266 which is supported concentrically with the outer tube 264 by means of support walls 267 which, in the open condition of the valve, may extend as continuations of the support walls of the fixed seat unions 280. The internal diameters of the inner and outer tubes 264, 266 generally match those of the inner and outer pipes 12,11 of the main conduit, so that the valve is effectively of a full port type with minimal reduction of flow cross-section through the valve in the open condition. In the closed condition, with the actuating spindle 262 turned a quarter turn, the external ball surface 265 turns around to close off entirely the pipes at both sides of the valve 250, with sealing around the seats 281 of the seat union. Seals at these points may be provided by resilient or deformable seal members, such as PTFE rings (not shown). No discrete seal member is provided for sealing between the inner union tube 282 of the seat union and the inner tube 266 of the ball 261 in the open position. Close proximity suffices for ordinary operation because the same system water is present in both conduits and a modicum of leakage is not harmful provided that adequate pumping pressure is maintained.

FIGS. 12, 14 and 15 show an optional novel refinement of the isolator valve. In a conventional ball valve a spherical ball surface segment makes an annular outer seal which fully closes or blocks the opening of a single pipe. In the present valve there is an additional inner pipe (inner tube 282) defining its own inner conduit. If the side surface of the valve ball is spherical, it will substantially close off the end 283 of the inner pipe in the closed position although it will not fully seal it unless special measures are taken. As in the open position, a degree of leakage at this position is not serious. However in the present systems, a flow which continuously circulates by communication between outflow and return conduits is of special value because it enables sanitary operation. A further optional proposal here is therefore to provide, in the side (sealing) face of the ball member 261 on one or both sides thereof, a recessed portion 268 (recessed relative to a spherical shape envelope, such as for example a flat region) as indicated in dotted lines in FIGS. 12, 14 and 15. In the closed condition, the recessed portion 268 is spaced away from the end 283 of the inner union tube 282 and puts the outflow and return conduits into communication for substantial flow between the inner and outer conduits on that side of the valve, although the valve as a whole remains completely closed by the outer seals 281. If the valve 251 is positioned in or at the end of a branch conduit, this enables the branch conduit—which might otherwise become static and non-sanitary—itself to maintain a circulating flow although the user point is out of operation, so that the whole system maintains operational effectiveness.

FIGS. 16(a) and (b) show a slightly modified form of the isolator valve 1250 including seals and insert unions. The general concept of operation is the same as before.

FIG. 17 shows schematically how the hot water flow circuit 1001 may be branched to serve multiple floors A, B, C, D of a building, and how isolator valves 1250 as described above may be positioned in the system e.g. to enable isolation of a branch from the rest of the system. Sanitary conditions and flow can be maintained in the active part of the system because the isolator valve 1250 has internal clearance which allows for return flow circulation as explained above.

The invention claimed is:

1. An isolation valve for a fluid flow system having concentric conduits, the valve comprising:
   a movable closure element; and
   a fixed structure,
   the movable closure element comprising an outer tube with an external spherical surface portion and an inward surface defining an outer conduit, and also comprising an inner tube that is coaxial with the outer tube and supported inside the outer tube by a support structure comprised of plural circumferentially-spaced struts, fins or axially-extending walls, thereby defining an inner conduit, and
   the fixed structure comprised of first and second sealing portions to seal against and around respective oppositely-directed ends of the moveable closure element,
   wherein an inner conduit flow segment of the valve is defined in the inner tube of the moveable closure element,
   wherein an outer conduit flow segment of the valve is defined between the inner tube and the inward surface of the outer tube,
   wherein the fixed structure further comprises a valve housing, inner tubular union portions for inner pipes of said concentric conduits of the fluid flow system, and outer tubular union portions for outer pipes of said concentric conduits of the fluid flow system, and wherein the valve housing carries an external operating member whereby the moveable closure element can be turned between open and closed positions, the open position being a position in which the inner and outer conduit flow segments of the movable closure element register respectively with the inner and outer pipes of the concentric conduits for flow through the valve, and the closed position being a position in which an external surface portion of the movable closure element engages a said sealing portion, at least at one side of the valve, to close off flow through the valve in the outer conduit, and at said at least one side of the valve, the movable closure element has a side surface having a relatively recessed portion which in the closed position is recessed away from the inner tubular union portion, providing flow communication between the inner and outer conduits.

2. A circulating water system with a water flow circuit defined by pipework leading out from and back to a pump to drive circulation of the water, the water flow circuit comprising a conduit having concentric inner and outer pipes, wherein an isolation valve of claim 1 is coupled into said conduit.

3. An isolation valve for a water system to be coupled into a conduit having concentric inner and outer pipes, the valve comprising:

a movable closure element;

a fixed structure;

the movable closure element comprising an outer tube and an inner tube coaxial with the outer tube and supported inside it by a support structure, an inner conduit flow segment of the valve being defined in the inner tube and an outer conduit flow segment of the valve being defined between the inner tube and an inward surface of the outer tube, and the fixed structure comprising a valve housing, first and second sealing portions to seal against and around respective oppositely-directed ends of the moveable closure element, inner tubular union portions for the inner pipes of the adjacent lengths of the conduit, and outer tubular union portions for the outer pipes of the adjacent lengths of the conduit; and an external operating member carried by the valve housing whereby the moveable closure element can be turned between open and closed positions, the open position being a position in which in use the inner and outer conduit flow segments of the movable closure element register respectively with the inner and outer pipes of the conduit for flow through the valve, the closed position being a position in which an external spherical surface portion of the movable closure element engages a said sealing portion to close off flow through the valve at the outer conduit, at least one side of the valve, and a side surface of the movable closure element at said side of the valve having a relatively recessed portion which in the closed position is recessed away from the inner tubular union portion at that side, to provide flow communication between the inner and outer conduits on that side of the closed valve.

4. The isolation valve of claim 3, wherein said support structure is plural circumferentially-spaced struts, fins or axially-extending walls.

5. The isolation valve of claim 3, wherein the movable closure element is a ball element.

6. The isolation valve of claim 5, wherein said inward surface of the outer tube is a cylindrical surface.

7. The isolation valve of claim 3, said valve being a quarter-turn valve.

8. A circulating water system with a water flow circuit defined by pipework leading out from and back to a pump to drive circulation of the water, the water flow circuit comprising a conduit having concentric inner and outer pipes, wherein an isolation valve of claim 3 is coupled into said conduit.

9. The circulating water system of claim 8, wherein the inner tubular union portions of the valve slide into or around the inner pipes of the adjacent lengths of the conduit, and the outer tubular union portions slide into or around the outer pipes thereof.

10. The circulating water system of claim 8, said water system being a hot water system comprising a heater acting on said flow circuit to heat water flowing therein.

11. The circulating water system of claim 10, wherein the flow circuit is branched to serve multiple floors of a building, and respective ones of said isolator valves are positioned in the system to enable isolation of the branches from the rest of the system.

12. The isolation valve of claim 3, wherein at a second side of the valve, the movable closure element has a second side surface with a second relatively recessed portion.

* * * * *